United States Patent

Farnham et al.

[15] 3,640,219

[45] Feb. 8, 1972

[54] METHOD OF DRY PREPARATION OF RELIEF PRINTING PLATES

[72] Inventors: Norman W. Farnham; William J. Mueller, both of Webster; Donald J. Gorall, Rochester, all of N.Y.

[73] Assignee: Burroughs Corporation, Detroit, Mich.

[22] Filed: Aug. 4, 1969

[21] Appl. No.: 847,148

[52] U.S. Cl. ..........................101/401.1, 101/395, 250/65 T, 96/38.3, 156/234

[51] Int. Cl. ..........................B41c, B41n

[58] Field of Search ..........................96/36.3, 28; 250/65 T; 101/395, 401.1; 156/234

[56] References Cited

UNITED STATES PATENTS

| | | | |
|---|---|---|---|
| 2,875,051 | 2/1959 | De Maria | 96/36.3 X |
| 3,060,024 | 10/1962 | Burg et al. | 96/28 |
| 3,101,668 | 8/1963 | Leeds | 101/401.1 |
| 3,113,514 | 12/1963 | Hogan | 101/395 X |
| 3,177,086 | 4/1965 | Newman et al. | 250/65 T X |

*Primary Examiner*—David Klein
*Attorney*—Kenneth L. Miller and Charles S. Hall

[57] ABSTRACT

An improved method for preparing relief printing plates by transfer of selected portions of a dry, uncured, heat-sensitive polymer dispersion layer from a donor sheet to a printing plate through fusion under infrared radiation. Infrared-absorbing indicia are deposited on a printing plate base having an affinity for fusion with the polymer dispersion under infrared heat. The printing plate base having indicia thereon is placed in intimate physical contact with the polymer dispersion layer of the donor sheet. By application of infrared energy, portions of the polymer dispersion layer are polymerized and hardened in the desired image and fused to the printing plate base to and through the indicia. The donor sheet with the unfused portions of the polymer dispersion, peels away easily leaving a finished printing plate with the indicia incorporated therein.

5 Claims, 7 Drawing Figures

INVENTORS.
NORMAN W. FARHAM.
WILLIAM J. MUELLER.
DONALD J. GORALL.

METHOD OF DRY PREPARATION OF RELIEF PRINTING PLATES

SUMMARY OF THE INVENTION

The preparation of printing members through the selective application of infrared heat to a thermoplastic material is known. A listing of this art, including an analysis of the most relevant U.S. patents, is presented in assignee's copending U.S. Pat. application Ser. No. 668,133, entitled "Relief Print Member and Method of Preparing and Composing Same," filed Sept. 15, 1967.

The prior art involves the use of solvents or etchants to remove the unfused and soluble portions of the thermoplastic material after the selective application of infrared heat. Applicants have developed a greatly simplified method for preparing relief printing plates through selective application of infrared energy to polymer dispersion material, resulting in a relief printing plate of excellent quality, without further chemical or heat processing.

Under applicant's inventive method, infrared absorbent indicia are deposited, e.g., through typing or inscription, on a printing plate base of material having affinity for fusion adherence to a polymer dispersion material under infrared heat. A donor sheet is utilized having a polymer dispersion layer adhering to a base to which the layer does not fuse under infrared heat of processing temperatures. The polymer dispersion layer is placed in intimate physical contact with the infrared-absorbent indicia on the printing plate base. By application of infrared radiation, the desired image is transferred from the donor sheet to the printing plate by fusion. The donor sheet, having unfused portions adhering thereto, peels away easily leaving a finished excellent quality relief printing plate.

BRIEF DESCRIPTION OF THE DRAWINGS

The invention will best be understood by reference to the following detailed description in connection with the accompanying drawings, in which.

DETAILED DESCRIPTION OF THE INVENTION

Figures 1, 2, 2A, 3, 4, 5, 6:
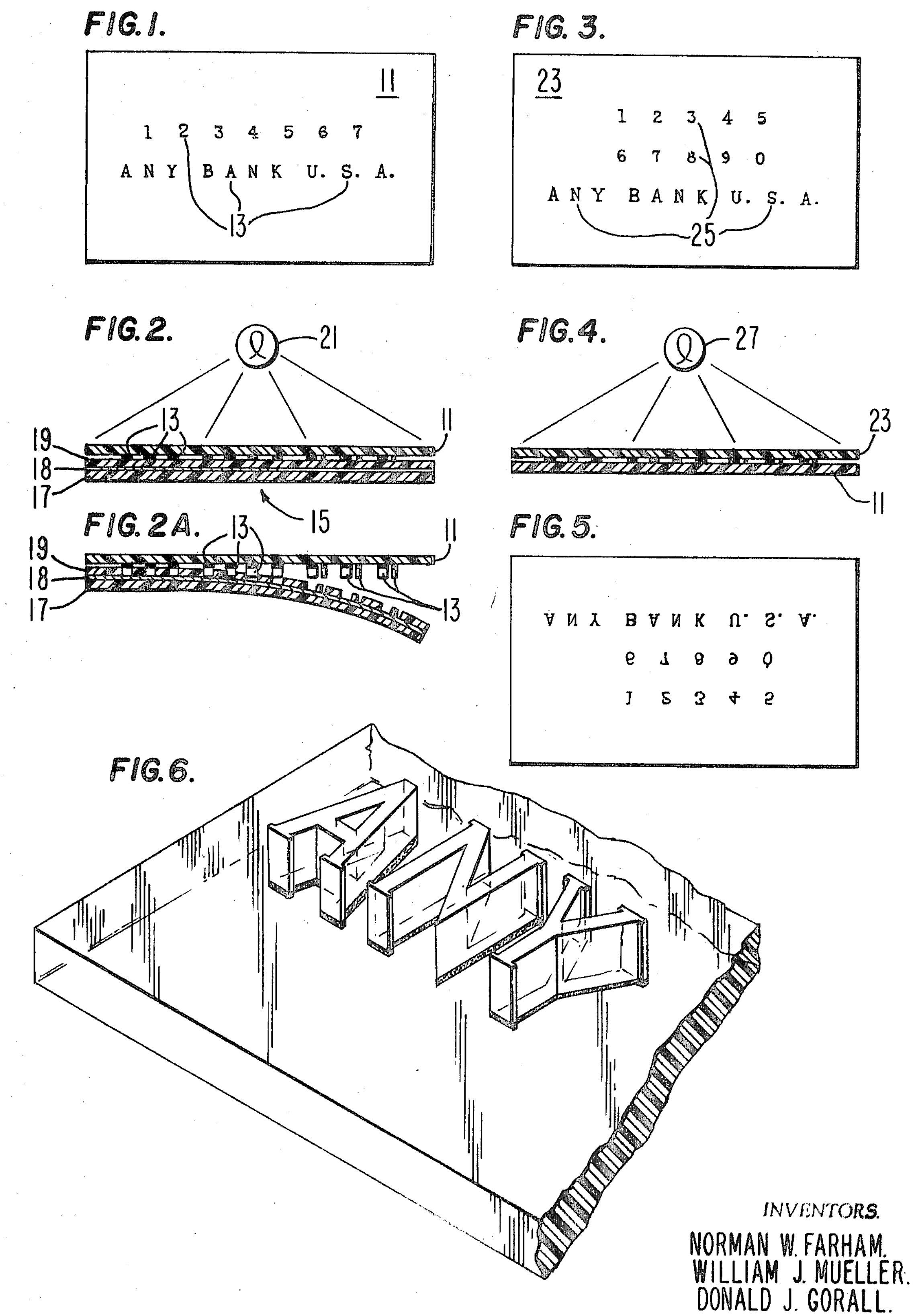
FIG. 1 is an illustration of printing plate base having infrared-absorbent indicia deposited thereon.
FIG. 2 is a schematic illustration showing the arrangement of printing plate base of FIG. 1 with its infrared-absorbent indicia in intimate contact with the polymer dispersion layer of a donor sheet during application of infrared energy.
FIG. 2A is a cross-sectional view of a printing plate base being separated from the donor sheet after selective polymerization of the donor sheet material.
FIG. 3 is an illustration of a transfer sheet having infrared-absorbent indicia deposited thereon for use in preparation of reverse image relief printing plate.
FIG. 4 is a schematic illustration of the arrangement of the transfer sheet of FIG. 3 with its infrared-absorbent indicia in intimate physical contact with a printing plate base during application of infrared radiation.
FIG. 5 is an illustration of a reverse image relief printing plate prepared under applicants' method.
FIG. 6 is a perspective view of raised characters on a printing plate made according to the invention.

Referring to FIG. 1, the printing plate base 11 is composed of material which will accept the deposit of infrared-absorbent indicia 13, such as carbon blacks, black iron oxides, manganese dioxide, cupric oxide or cobaltic oxide, by typing or inscription through a typewriter ribbon or carbon paper coated or impregnated with inks containing such pigments. The imaging materials 13 must adhere to the printing plate base 10 and to polymer dispersion material as explained hereinafter upon application of infrared radiation.

The printing plate base is preferably composed of material that is dimensionally stable over the operating temperature range of the process. Several materials have been found suitable, such as:

a. homo- and copolymers of polyvinyl chloride b. polymers and copolymers of polyvinyl acetate c. polymers and copolymers of methacrylic acid esters d. paper coated or impregnated with *a*, *b*, or *c* or other suitable polymeric coating materials such as ethyl cellulose e. any structurally stable material, including metal, coated with *a*, *b*, or *c*, and f. linear, solvent soluble polyester films and sheets and structurally stable polymeric films and sheets coated with or laminated to a linear solvent-soluble polyester.

A polyvinyl chloride/acetate copolymer manufactured by Tenneco Chemical, Inc. under the trade name VCR 1001 has been found particularly satisfactory as have cellulose triacetate and celanar or mylar polyester sheeting coated with solvent-soluble, solid, linear, polyester resins.

The printing plate base sheet can be almost any thickness, but practical limits of 0.003 to 0.015 inch are usually observed with a preferred caliper range 0.004 to 0.006 inch of ±0.0002 inch.

The thickness is in part determined by the application to which the resulting printing plate is to be placed. If the plate is to be used on a press where it is supported throughout its length, the base can be relatively thin. On the other hand, if the relief printing plate is to be used as a credit card, then it should be relatively thick in order to be self-supporting and able to withstand the normal abuse to which credit cards are placed. The base should be resistant to dimensional distortion and absorption of materials from the coating at temperatures below the final imaging temperatures.

The caliper of the printing plate base should be held to very close tolerances since uneven areas may cause uneven printing pressure with loss of printing quality.

The base plate is preferably colorless with a minimum near infrared transmission of 80 percent.

The donor sheet numbered generally at 15 in FIG. 2 is composed of a base sheet 17, a subcoating 18, and a polymer dispersion layer 19. The donor base sheet 17 is a smooth substrate of any sheet or roll material which is substantially a nonabsorber of infrared energy and which does not interact with the ingredients coated thereon.

Representative materials which may be used to form the base sheet 17 are:

a. polyvinyl chloride b. cellulose acetates, propionate, acetate butyrate c. polyamide films or sheeting (nylon)

d. polyester films on sheeting (mylar)

e. aluminum foil f. thermosetting acrylic-coated aluminum or steel foil g. polystyrene h. polyethylene i. polypropylene j. alkyl acrylates and methacrylates In addition, paper coated with the above polymers, or laminated and coated combinations of the above polymers, can be used for the base of the donor sheet.

Applicants prefer a base sheet or substrate 17 of cellulose triacetate. The thickness may range from 0.003 to 0.015 inch, but 0.005 to 0.0075 inch is preferred. Polystyrene should be used only if a relatively short shelf life is acceptable.

In order to provide a donor sheet which will have the proper adhesion of the pregelled polymer dispersion layer before the imaging takes place and the desirable release characteristics when the image has been formed, we utilize a subcoating 18. The basic requirements of the subcoating are:

1. The solvents used in depositing the subcoating 18 should have boiling points below about 130° C. and should be only weak solvents or nonsolvents for the substrate 17.

2. The subcoating 18 must adhere tightly to the substrate, and adhesion should not deteriorate with age or environment factors such as temperature, humidity, exposure to radiation, etc.

3. The subcoating 18 must not extract nor permit passage of plasticizers from the overlying polymer dispersion layer.

4. The subcoating 18 must have strong adhesion also for the pregelled polymer dispersion layer 19, but this adhesion must be strikingly reduced by the further infrared curing of the imaged areas. This result is necessary to cause the imaged areas of layer 19 to strip from the donor sheet assembly, but to permit the areas not affected by radiation to remain tightly adhered to the donor sheet.

The characteristics are obtained by a thin (0.00007 to 0.0004 inch) coating of resin which is applied in solution and then dried and cured in a continuous oven.

| Subcoating | Example A (Preferred) | |
|---|---|---|
| | Optimum | Operable Range |
| Cellulose acetate butyrate EAB500-1 | 1.0 | 0.2-3.0 |
| Acrylic polymer ZR-116 (Dry Weight) | 14.0 | 20.0-10.0 |
| Toluene | 18.0 | 24.4-12.2 |
| Benzene | 67.0 | 55.4-74.8 |
| Totals: | 100.0 | 100 100 |

EAB-500-1 is an Eastman Kodak grade of cellulose acetate butyrate. ZR-116 is a Rohm & Haas acrylic polymer, 45 percent solution in toluene.

| Subcoating | Example B |
|---|---|

Rhoplex HA-8, HA-12, or HA-16 emulsion.
Rhoplex HA-8, HA-12 or HA-16 are Rohm & Haas nonionic, self-cross-linking acrylic polymer emulsions, 45 percent solids in water.

| Subcoating | Example C |
|---|---|

Gelva Multipolymer Solution 270.
Gelva 270 is Monsanto Company's self-curing polyvinyl acetate copolymer, 55 percent solids in ethanol.

The above subcoating may be applied by any means suitable for the uniformity (±10 percent) required. A drying temperature of 240° F. in a 20-foot oven at a web speed of 50 feet per minute has been found to permit satisfactory drying and degree of cure for all of the above formulations.

The operable coating weight range is 1.0 to 2.0 lb. of dry coating per 1,000 sq. ft. of substrate, but the optimum coating weight range has been found to be 1.5 to 1.75 lb. per 1,000 sq. ft.

In each of the three examples of subcoating shown, the resins are capable of being cured to be much less solvent-soluble than their normal air dried state. This curing is effected by the elevated temperatures in the oven drying mentioned. The degree and type of polymerization desired is satisfied by the mechanism of self-cross-linking during the curing process.

By keeping the subcoating 18 very thin (0.00007 to 0.0004 inch) it is found that the adhesion of the subcoating to the substrate 17 is improved and the other desired characteristics are more readily accomplished.

The heat-sensitive polymer dispersion layer 19 of the donor sheet should be as thick as the depth of relief desired in the printing plate. For letterpress printing applications the coating would be within the working limits of 0.002 to 0.010 inch. The preferred coating thickness is in the range of 0.003 to 0.005 inch. The polymer dispersion is a moderately viscous nontacky and self-leveling fluid which should be free from dust, fibers and occluded air bubbles.

The coating used in the present invention can consist of a dispersion of a solid resinous material in a mixture of solid or liquid plasticizer and a compatible liquid monomer of low vapor pressure which has the ability to cross-link during polymerization. Using high-shear equipment the dispersion resin should be uniformly dispersed throughout the mixture of plasticizer and liquid monomer along with a catalyst and any fillers, wetting agents and leveling agents needed to provide the rheological properties necessary for coating.

A trace of dye can also be added to the composition to facilitate examination and inspection of the coating, provided a dye is selected that is not infrared-absorbing.

The dispersion coating undergoes distinct property changes on heating. When originally prepared for coating, the composition is a moderately viscous nontacky liquid. After application to a base sheet and heating to a first pregelling temperature, the dispersion resin absorbs some of the liquid plasticizer and plasticizing monomer which causes the resin particles to swell and lock together forming a dry coating of low cohesivity. On heating to a second higher temperature, the plasticizer and monomer dissolve the dispersion resin and the catalyst initiates polymerization and cross-linking of the polyfunctional liquid monomer to form a solid, cohesive, solvent-insoluble solution.

The dispersion resins used in preparing the heat-sensitive coatings of the present invention should be in a finely divided form and capable of forming stable dispersions in compatible liquid plasticizers and monomers. Resin particles between 0.1 and 10 microns are suitable with 0.5 to 1.5 microns the preferred size. The following are representative resins for use either singly or in combination in preparing the heat-sensitive dispersion coatings of the present invention:

a. polyvinyl chloride
b. copolymers of vinyl chloride and vinylidene chloride
c. acrylic resins
d. polyolefins
e. micronized polyethylene
f. vinyl chloride maleic ester copolymers
g. copolymers of vinyl chloride and vinyl acetate The preferred resin for use in preparing the heat-sensitive dispersion of the present invention is high molecular weight polyvinyl chloride in view of its ready availability and low cost. Such polyvinyl chloride is available, among others, from Monsanto Company as "Opalon 440" and "Opalon 3142," from Diamond Alkali Company as "PCV-71" and from B. F. Goodrich Chemical Co. as "Geon 128." Micronized polyethylene is manufactured, for example, by U.S. Industrial Chemicals Co.

The plasticizer-monomer mixture employed in the coating composition of the present invention should have the following properties: (1) nonvolatility at ambient conditions and at temperature of pregelling, (2) nonsolvency for the dispersion resin at room ambient temperatures, up to 120° F., (3) limited solvency for the dispersion resin at selected pregelling (175°-230° C.) temperatures, (4) high solvency for the dispersion resin at high (300° F. +) temperatures, (5) nonsolvency for a plastic base sheet at room temperatures, (6) high solvency for a plastic base sheet at (300° F. +) temperatures, and (7) the ability to cross-link to become a solvent-insoluble polymer at the higher (300° C. +) temperatures. Substitution for the monomer of a plasticizer having the first six characteristics but being unpolymerizable, will also give satisfactory results but greatly limits the types of printing inks and ink clean-up solvents which can be used on the composed and developed relief printing plate and, additionally, produces softer, less abrasion-resistant relief characters.

The following are representative examples of plasticizers suitable for use in compounding the coating compositions of the present invention:

a. Phthalate esters
diethyl
di n-butyl
di isohexyl
di 2-ethylhexyl
di isononyl
di isodecyl
di isoundecyl
di isotridecyl
diphenyl
dicapryl di 2-propylheptyl
dicyclohexyl
di n-hexyl
butyl 2-ethylhexyl
2-ethylhexyl isodecyl
isohexyl isodecyl
2methylpentyl isodecyl
butyl cyclohexyl
butyl benzyl
n-octyl n-decyl b. Isophthalate esters
di 2-ethylhexyl
di isodecyl
di isononyl
butyl 2-ethylhexyl
2-ethylhexyl isodecyl c. Terephthalate esters
2-ethylhexyl d. Adipate esters
di isodecyl
di 2-ethylhexyl
di isononyl
dioctyl e. Azelate esters
di 2-ethylhexyl
dioctyl f. Sebacate esters
dibenzyl
di 2-ethylhexyl
butyl
dioctyl g. Phosphate esters
tricresyl
cresyl diphenyl
2-ethylhexyl diphenyl
didecyl cresyl
di-2-ethylhexyl phenyl
tri-2-ethylhexyl
tri-n-butyl
triphenyl h. Dibenzoate esters
diethylene glycol
dipropylene glycol
polyethylene glycol
octylene glycol
3-methyl-1, 5-pentanediol i. Citrate esters
acetyl tributyl
acetyl tri-2-ethylhexyl j. Glycol esters
triethylene glycol dihexoate
triethylene glycol di-2-ethylhexoate
polyethylene glycol di-2-ethylhexoate
diethylene glycol dipelargonate k. Epoxidized soybean oil l. Polyisobutylenes The plasticizers can be used singly or mixtures of the plasticizers can be used to produce particular properties. Applicants prefer dicapryl phthalate.

The polymerizable monomer used in the coating composition should be a monomeric liquid of low vapor pressure having the ability to cross-link during polymerization under the influence of catalysis initiated by heat. The following materials are representative examples of suitable liquid monomers:

a. 1,3 butylene glycol dimethacrylate
b. trimethylol propane trimethacrylate
c. ethylene glycol dimethacrylate
d. triethylene glycol dimethacrylate
e. tetraethylene glycol dimethacrylate
f. diallyl fumarate
h. 1, 4 butane diol diacrylate
i. 1, 4 butane diol dimethacrylate
j. 1, 3 butylene glycol diacrylate
k. cyclohexyl acrylate
l. 1, 10 decamethylene glycol dimethacrylate
m. diethylene glycol diacrylate
n. diethylene glycol dimethacrylate
o. 2, 2 dimethyl propane diacrylate
p. 2, 2 dimethyl propane dimethacrylate
q. glyceryl trimethacrylate
r. 1. 6 hexane diol diacrylate
s. 1, 6 hexane diol dimethacrylate
t. neopentyl glycol diacrylate
u. neopentyl glycol dimethacrylate
v. polyethylene glycol (200) diacrylate
w. tetraethylene glycol diacrylate
x. triethylene glycol diacrylate
y. 2, 2, 4 trimethyl-1, 3-pentane diol dimethacrylate
z. trimethylol ethane trimethacrylate
aa. trimethylol propane triacrylate
bb. tripropylene glycol dimethacrylate Applicants have found trimethylol propane trimethacrylate to have excellent characteristics for this purpose. It is available, for example, from Sartomer Resins, Inc. as "SR-350" or from Rohm & Haas Co. as "X-980."

The following can also be used as polymerizable plasticizer monomers but their polymerized structure is linear and less solvent-resistant than the cross-linked polymers:

a. dodecyl methacrylate
b. lauryl methacrylate
c. stearyl methacrylate
d. butyl cellosolve acrylate
e. n-decyl acrylate
f. n-decyl methacrylate
g. 2-ethoxyethyl methacrylate
h. 2-ethyl hexyl methacrylate
i. isononyl methacrylate
j. octadecyl acrylate
k. oleyl methacrylate
m. tridecyl methacrylate
n. 3, 5, 5 trimethyl hexyl methacrylate
o. 2, 2, 4-trimethyl pentane diol isobutyrate, 3-methacrylate These, however, can be mixed with the polyfunctional monomers to give copolymers which are insoluble.

In addition to rendering the final relief character insoluble, the monomer greatly improves character hardness and wear resistance. For relief printing plates in which such characteristics are not important, the monomer can be omitted.

Along with the dispersion resin and plasticizers and monomer, other ingredients such as catalysts, fillers, leveling and wetting agents and stabilizers can be added to the coating composition. Organic peroxide-type catalysts, for example, dicumyl peroxide and di-butyl peroxide and t-butyl perbenzoate are preferred for use in the coating composition in view of their stability against premature decomposition.

Fillers such as amorphous silica and barium sulfate can be used to add firmness or body to the coating. Wetting agents such as the polyethylene glycol oleates. stearates and laurates and leveling agents such as lecithin, Tenlo-70 or Trem 014, made by the Nopco Chemical Company and Modaflow made by the Monsanto Company, can be added if desired and as known in the art to improve the coating and leveling properties of the dispersion coating. A suitable stabilizer, if desired, is sold by Ferro Corporation under the trade name 8V100. Polyoxyethylene ester of tall oil is available from Monsanto as Sterox CD.

The composition of a polymer dispersion layer for applicants' donor sheet may be formulated generally in percent by volume:

| | |
|---|---|
| Polymeric dispersion resin | 50–70% |
| Plasticizer | 15–48% |
| Monomer | 2–30% |
| Pigment | 0–20% |
| Catalyst | 0.02–0.4% |
| Surfactants | 0–3% |
| Stabilizer | 0–3% |
| Dye | Trace |

Specific examples of polymer dispersions which can be used in the composition of the donor sheet in applicants' method are as follows:

EXAMPLE 1

| Material | Percentage by weight |
|---|---|
| Vinyl chloride homopolymer resin | 63.2 |
| Dicapryl phthalate | 29.0 |
| Trimethylol propane trimethylcrylate | 7.1 |
| t-butyl perbenzoate | 0.07 |
| Polyethylene glycol 1000 monostearate | 0.3 |
| Leveling agent | 0.3 |
| Dye | 0.03 |

EXAMPLE 2

| Material | Percentage by weight |
|---|---|
| Vinyl chloride copolymer resin | 64.8 |
| Diallyl phthalate | 9.0 |
| Dioctyl azelate | 3.3 |
| Dioctyl phthalate | 19.4 |
| Leveling agent | 0.3 |
| Polyethylene glycol mono oleate | 0.3 |
| Stabilizer | 1.9 |
| t-butyl peroctoate | 1.0 |
| Dye | Trace |

EXAMPLE 3

| Material | Percentage by weight |
|---|---|
| Vinyl chloride copolymer | 55.00 |
| Acetyl tributyl citrate | 18.00 |
| Stearyl methacrylate | 6.05 |
| Ethylene glycol dimethacrylate | 20.00 |
| t-butyl hydroperoxide | 0.25 |
| Lecithin | 0.45 |
| Polyethylene glycol laurate | 0.25 |

EXAMPLE 4

| Material | Percentage by weight |
|---|---|
| Micronized polyethylene | 58.00 |
| Polyisobutylene (Mol. wt. 350) | 41.00 |
| Leveling agent | 1.00 |

In preparing the polymer dispersion layer composition, the plasticizer, if solid, should be melted and added to the liquid monomer with stirring. The remaining ingredients are then added with stirring and mixed. The solution is quite viscous, so a stirrer should be used that is strong enough to mix the ingredients smoothly and thoroughly without beating or vortexing, which would cause undesired inclusion of air. The mixture should then be passed through a three-roll ink mill to break up any agglomerates in the dispersion resin and to remove any air incorporated during the original mixing. The resulting liquid is a stable dispersion of resin in a liquid plasticizer and liquid monomer.

After the dispersion composition has been prepared, it is best coated on the donor base sheet 17, at a uniform thickness between 0.002 and 0.010 inch and then heated in a hot air oven at a temperature of from 80°–95° for 15–60 seconds depending upon coating and substrate thickness. Upon heating for this short time, the dispersion resin absorbs the monomer and plasticizer to produce a dry, gelled film of low cohesivity but does not dissolve in the plasticizer monomer mixture, nor does any polymerization take place. The coated product at this point is clean to handle and shows substantially no signs of deterioration for extended periods of time.

The following is an example of a formula for a dispersion layer composition under applicants' invention which contains no monomer:

EXAMPLE 5

| Material | Percentage by Weight |
|---|---|
| Polyvinyl chloride | 64.6 |
| Dioctyl azelate | 3.4 |
| Dioctyl phthalate | 29.4 |
| Leveling agent | 0.3 |
| Surfactant | 0.3 |
| Stabilizer | 2.0 |
| Dye | Trace |

Referring again to FIG. 2, the printing plate base 11 having infrared-absorbing indicia 13 on the surface thereof is shown in surface contact with the polymer dispersion layer of the donor sheet. A source of near-infrared radiation 21 (shown schematically) is used for irradiating the assembled sheets. The assembled sheets may be irradiated from either side as long as the sheet next to the infrared source transmits infrared energy. Neither sheet may absorb infrared in a nonimaged area to the extent that will cause a discernible temperature increase. Applicants prefer to expose the assembly to infrared energy through the printing base. However, if the base contains metal, the assembly must be irradiated from the donor sheet side. If the baseplate contains paper, the assembly must be irradiated from the donor sheet side, unless the paper is transparent to infrared energy.

The combined sheets should be exposed to the source of near-infrared radiation 21 (7,500 to 30,000 Angstrom units or preferably 9,000 to 18,000 Angstroms) for approximately 0.5 second. A high-intensity source of near-infrared radiation is preferred in order to reduce exposure time to a minimum. Quartz tube, tungsten filament, lamps, for example the General Electric T-2½ and T-3, can be operated to produce a broad range of infrared concentration from 100 watts per linear inch to 400 watts with the near-infrared energy concentration increasing with increasing voltage input and color temperature up to 3,000° K. It has been found that overvoltages should be used with any given lamp sufficient to produce a filament temperature of over 2,600° K.

Since the quartz tube lamp the near-infrared energy concentration is proportional to the filament temperature, the quartz envelope itself gets hotter as the amount of the near-infrared radiation increases and heat conducted through the air can become sufficient to tend to cure the nonimaged areas on the donor sheet. In exposing apparatus employing the General Electric T-2½ lamp, for example, the Thermofax units sold by Minnesota Mining and Manufacturing and the General Electric T-3 lamp in the Masterfax units sold by Ditto Incorporated, an exposure time of about 0.2 to 0.5 second appears to be sufficient. Each of the aforementioned units employs a quartz tube lamp with voltages boosted above line to increase energy output and shorten peak wavelength to from about 1 to 2 microns.

Under infrared radiation, the absorption of infrared energy by the indicia 13 on the printing plate base 11 will cause the portions of the donor dispersion layer 19 juxtaposed thereto to harden and fuse under heat to the printing plate 11. Since the dispersion layer adheres but does not fuse to the donor base sheet 17, the fused portions separate easily from the donor base sheet when the donor sheet 15 is peeled off the printing plate 11. The resulting relief printing plate needs no further processing and is immediately ready for use.

For printing purposes, e.g., for imprinting checks, a reverse image is required on the printing plate. Applicants have discovered that such a reverse printing plate can be prepared through a simple additional transfer operation.

As shown in FIG. 3, a transfer sheet 23 has deposited thereon infrared-absorbent indicia 25. The transfer sheet 23 can be of any noninfrared-absorbing material which will accept infrared-absorbent indicia and then transfer the indicia under infrared radiation. Among sheet materials having suitable surface energy have been found to be:

a. terephthalic acid polyester films
b. polyamide homopolymers and copolymers
c. polyolefins
d. olefin copolymers
e. parchmentized paper
f. ionomers
g. ethylene acrylic copolymers
h. ethylene-vinyl copolymers
i. cellulose acetate
j. cellulose acetate butyrate esters
k. cellulose propionate It has been found that the ionomers and acrylic-ethylene copolymers work particularly well as transfer sheet materials.

The infrared-absorbent indicia 25 may be composed, for example, of carbon blacks, iron oxides, manganese dioxide, cupric oxide or cobaltic oxide. The indicia may be deposited on the transfer sheet by pressure, as by typing or inscription, through a typewriter ribbon or carbon paper coated or impregnated with inks containing such pigments.

The transfer sheet 23 is assembled with its imaged indicia in intimate physical contact with the surface of the printing plate base 11, as shown in FIG. 4. Infrared energy is applied from a source shown schematically at 27 for a period of approximately 0.3 second. The infrared-absorbing indicia is transferred from the transfer sheet 23 to the printing plate base 11 and the operation as described above may proceed.

In the transfer operation infrared radiation can be applied from either side as long as the sheet next to the infrared source is transparent to infrared radiation below 3 microns and is substantially transparent to radiant energy up to 7 microns in wavelength, and the adjacent sheet either transmits or reflects infrared energy shorter than 3 microns and substantially all energy up to 7 microns.

In both the transfer operation and the fusion process, reasonable care should be observed as to the pressure used to achieve intimate contact between the infrared-absorbing indicia and the juxtaposed surface. It is apparent that insufficient pressure will not give intimate contact. On the other hand, too great pressure may result in incomplete transfer of the image in the transfer operation, or spreading of the polymer dispersion layer in the imaged area and extraneous polymer dispersion around an image area in the fusion operation.

The preferred embodiment as set forth herein was selected for utility with simple, semiautomatic infrared-exposing devices. With such equipment a printing plate can be made by untrained office personnel in 1 to 3 minutes. No further apparatus and no chemicals are necessary.

We claim:

1. A method for the preparation of relief printing plates comprising:

a. providing a donor sheet having a dry, uncured, polymer dispersion layer on a smooth substrate to which said dispersion layer adheres but does not fuse at its curing temperature, said polymer dispersion layer including a mixture of a finely divided solid polymeric material, a polymerizable liquid monomeric material and plasticizers for said polymeric material;
b. depositing infrared-absorbing indicia on a printing plate base to which said indicia will adhere, said indicia being composed of material to which said polymer dispersion will fuse under normal curing temperatures;
c. assembling said printing plate base and said donor sheet with said indicia in intimate contact with said polymer dispersion layer;
d. polymerizing selected portions of said polymer dispersion layer in the image of said indicia and fusing said portions to said printing plate base to and through said indicia by infrared radiation;
e. peeling said donor sheet with the uncured polymer dispersion adhering thereto off said printing plate base to leave a finished relief printing plate incorporating said indicia.

2. The method of claim 1 wherein the step of depositing indicia is achieved by pressure through a medium containing said infrared-absorbent material directly to the printing plate base.

3. The method of claim 1 wherein the step of depositing indicia is achieved by pressure through a medium containing said infrared-absorbent material onto a transfer sheet, assembling said transfer sheet and said printing plate base with said indicia in intimate contact with said printing plate base, exposing said assembled sheet and printing plate base to infrared radiation and peeling off said transfer sheet to leave an effective portion of said infrared-absorbing indicia on said printing plate base.

4. In the process of preparing a relief printing plate by polymerizing selected portions of a sheet of heat-sensitive polymer dispersion material and fusing said portions to a printing plate base by application of near-infrared radiation, the steps of:

depositing near-infrared-absorbent indicia on said printing plate base,
assembling said polymer dispersion sheet in intimate contact with said indicia, and
fusing portions of said polymer dispersion sheet in the image of said indicia and bonding said polymerized portions to said printing plate base, incorporating said infrared-absorbent indicia between said polymerized portions and said printing plate base.

5. A method for the preparation of relief printing plates comprising:

a. providing a donor sheet having a dry, uncured, polymer dispersion layer on a smooth subcoated substrate to which said dispersion layer adheres but does not fuse at its curing temperature, said polymer dispersion layer including a mixture of a finely divided polymeric material and a plasticizer for said polymeric material;
b. depositing infrared-absorbing indicia on a printing plate base to which said indicia will adhere, said indicia being composed of material to which said polymer dispersion will fuse under normal curing temperatures;
c. assembling said printing plate base and said donor sheet with said indicia in intimate contact with said polymer dispersion layer;
d. fusing selected portions of said polymer dispersion layer in the image of said indicia and bonding said portions to said printing plate base to and through said indicia by infrared radiation; and
e. peeling said donor sheet with the uncured polymer dispersion adhering thereto off said printing plate base to leave a finished relief printing plate incorporating said indicia.

* * * * *